United States Patent
Chen et al.

(10) Patent No.: US 8,855,409 B2
(45) Date of Patent: Oct. 7, 2014

(54) THREE-DIMENSION IMAGE PROCESSING METHOD AND A THREE-DIMENSION IMAGE DISPLAY APPARATUS APPLYING THE SAME

(71) Applicant: Novatek Microelectronics Corp., Hsinchu (TW)

(72) Inventors: Chun-Wei Chen, Taipei (TW); Guang-Zhi Liu, Shanghai (CN); Chun Wang, Shanghai (CN); Jian-De Jiang, Xian (CN)

(73) Assignee: Novatek Microelectronics Corp., Hsinchu (TW)

( * ) Notice: Subject to any disclaimer, the term of this patent is extended or adjusted under 35 U.S.C. 154(b) by 156 days.

(21) Appl. No.: 13/668,742

(22) Filed: Nov. 5, 2012

(65) Prior Publication Data
US 2013/0114884 A1 May 9, 2013

(30) Foreign Application Priority Data
Nov. 4, 2011 (CN) .......................... 2011 1 0344675

(51) Int. Cl.
*G06K 9/00* (2006.01)
*G06K 9/40* (2006.01)
*H04N 13/02* (2006.01)
*H04N 13/00* (2006.01)

(52) U.S. Cl.
CPC ......... *H04N 13/0022* (2013.01); *H04N 13/026* (2013.01)
USPC .......................................... 382/154; 382/264

(58) Field of Classification Search
CPC ................ G06T 7/0075; G06T 7/0051; G06T 2207/10028; G06T 2207/20024
USPC .......................................................... 382/154
See application file for complete search history.

(56) References Cited

U.S. PATENT DOCUMENTS

| 8,384,763 B2 * | 2/2013 | Tam et al. ........................ 348/43 |
| 8,488,868 B2 * | 7/2013 | Tam et al. ...................... 382/154 |
| 2013/0009952 A1 * | 1/2013 | Tam et al. ...................... 345/419 |

OTHER PUBLICATIONS

Zhang, L.; Wa James Tam, "Stereoscopic image generation based on depth images for 3D TV," Broadcasting, IEEE Transactions on , vol. 51, No. 2, pp. 191,199, Jun. 2005.*
Sang-Beom Lee and Yo-Sung Ho. 2009. "Discontinuity-adaptive depth map filtering for 3D view generation." In Proceedings of the 2nd International Conference on Immersive Telecommunications (IMMERSCOM '09). ICST (Institute for Computer Sciences, Social-Informatics and Telecommunications Engineering), ICST, Brussels, Belgium.*

* cited by examiner

*Primary Examiner* — Utpal Shah
(74) *Attorney, Agent, or Firm* — Rabin & Berdo, P.C.

(57) ABSTRACT

A three-dimension (3D) image processing method is disclosed. A plurality of asymmetric filtering is performed on an input depth map to obtain a plurality of asymmetric filtering results. One among the asymmetric filtering results is selected as an output depth map. A two-dimension (2D) image is converted into a 3D image according to the output depth map.

10 Claims, 3 Drawing Sheets

THREE-DIMENSION IMAGE PROCESSING METHOD AND A THREE-DIMENSION IMAGE DISPLAY APPARATUS APPLYING THE SAME

This application claims the benefit of People's Republic of China application Serial No. 201110344675.4, filed Nov. 4, 2011, the subject matter of which is incorporated herein by reference.

TECHNICAL FIELD

The disclosure relates in general to a three-dimension (3D) image processing method and a 3D image processing apparatus applying the same.

DESCRIPTION OF THE RELATED ART

As three-dimension (3D) image provides more fun in entertainment, more and more display apparatuses (such as 3D TV) support 3D image display. Since an input image signal received by the 3D display apparatus may be a two-dimension (2D) image, the 3D display apparatus converts the 2D image into a 3D image.

The process of converting a 2D image into a 3D image (also referred as 3D wrapping) is made with reference to the depth map. Here, "depth" refers to the degree of closeness of an object sensed by a viewer when watching an image. The depth map includes many depth bits, each representing a depth of a pixel in the 2D image. Based on the 2D image with a known view angle and its corresponding depth map, a stereoscopic image may thus be provided to the viewer.

After the 2D image is converted into a 3D image, the 3D image includes a left-eye image signal and a right-eye image signal. When viewing the 3D image, if disparity occurs between the left-eye image signal viewed by the left-eye and the right-eye image signal viewed by the right-eye, the viewer will feel the object stereoscopic. Conversely, if there is no disparity, the viewer will feel the object planar.

In general, to display the object at a far distance, the left-eye image signal is shift to the left and the right-eye image signal is shift to the right. Conversely, to display the object at a near distance, the left-eye image signal is shift to the right and the right-eye image signal is shift to the left. The directions towards which the left-eye image signal and the right-eye image signal will be shift and the shift distance may be obtained by looking up the depth map. Normally, the shift distance is expressed in terms of pixels such as ½, ¼ and ⅛ pixel.

Let the 8-bit depth map be taken for example. If the depth bit is 255, the viewer will feel the object close. If the depth bit is 0, the viewer will feel the object far.

If the left-eye and the right-eye image signals are shift in order to make the viewer feel the object stereoscopic, the viewer may experience visual holes. That is, some disocclusion areas Will be exposed. If these visual holes are not filled up, image quality will deteriorate severely.

Some solutions are provided to resolve the above problem. Despite these solutions may help to reduce the visual holes, blur/distortion/deformation/discontinuity may occur to boundaries of a foreground object, which refers to the object that the viewer feels close. Due to the large change in the boundaries of a foreground object, the viewer will feel uncomfortable when watching 3D images.

SUMMARY OF THE DISCLOSURE

The disclosure is directed to a three-dimension (3D) image processing method and a 3D image processing apparatus which applies an asymmetric low-pass filtering on a depth map.

According to an embodiment of the present disclosure, a three-dimension (3D) image processing method is disclosed. A plurality of asymmetric filtering is performed on an input depth map to obtain a plurality of asymmetric filtering results. One among the asymmetric filtering results is selected as an output depth map. A two-dimension (2D) image is converted into a 3D image according to the output depth map.

According to another embodiment of the present disclosure, a 3D image processing apparatus is disclosed. The apparatus includes a depth map processing unit, and a wrapping unit. The depth map performs a plurality of asymmetric filtering on an input depth map to obtain a plurality of asymmetric filtering results and selects one among the asymmetric filtering results as an output depth map. The wrapping unit is coupled to the depth map processing unit for converting a two-dimension (2D) image into a 3D image according to the output depth map.

The above and other contents of the disclosure will become better understood with regard to the following detailed description of the preferred but non-limiting embodiment(s). The following description is made with reference to the accompanying drawings.

Figure 1:
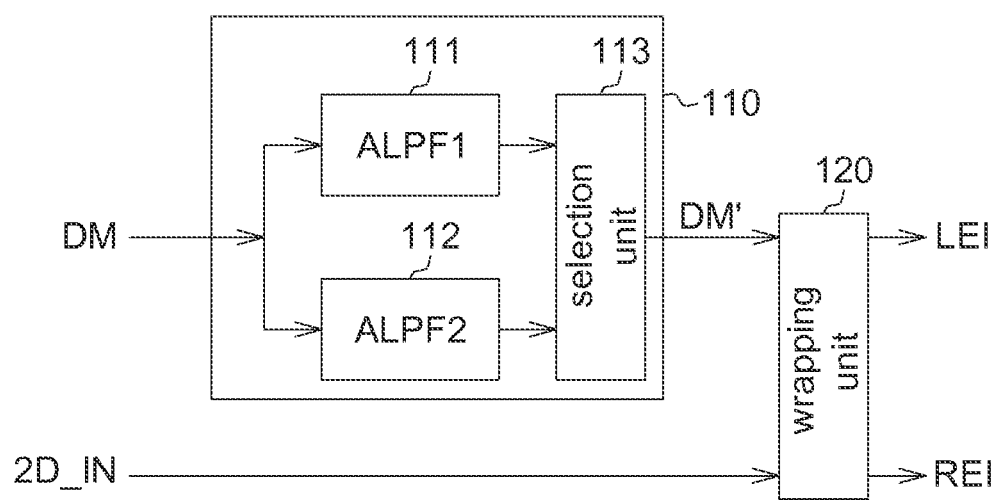
FIG. 1 shows a functional block diagram of a 3D image processing apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

In an embodiment of the disclosure, an asymmetric low-pass filtering is performed on a depth map, and a two-dimension (2D) image is converted into a three-dimension (3D) image according to the low-pass filtered depth map to mitigate the blur/distortion/deformation/discontinuity on the boundaries of a foreground object.

Referring to FIG. 1, a functional block diagram of a 3D image processing apparatus 100 according to an embodiment of the disclosure is shown. As indicated in FIG. 1, the 3D image processing apparatus 100 at least includes a depth map processing unit 110 and a wrapping unit 120. The depth map processing unit 110 at least includes asymmetric low-pass filters (ALPF) 111 and 112, and a selection unit 113.

The depth map processing unit 110 processes an input depth map DM into an output depth map DM'. The details of the operation of the depth map processing unit 110 are disclosed below.

The wrapping unit 120 performs 3D wrapping on a 2D input image 2D_IN according to the output depth map DM' from the depth map processing unit 110 to generate a left-eye image LEI and a right-eye image REI. The viewer may sense a 3D image when viewing the left-eye image LEI and the right-eye image REI at the same time. In the embodiment of the disclosure, the functions and operations of the wrapping unit 120 are not restrictive.

Figure 2:
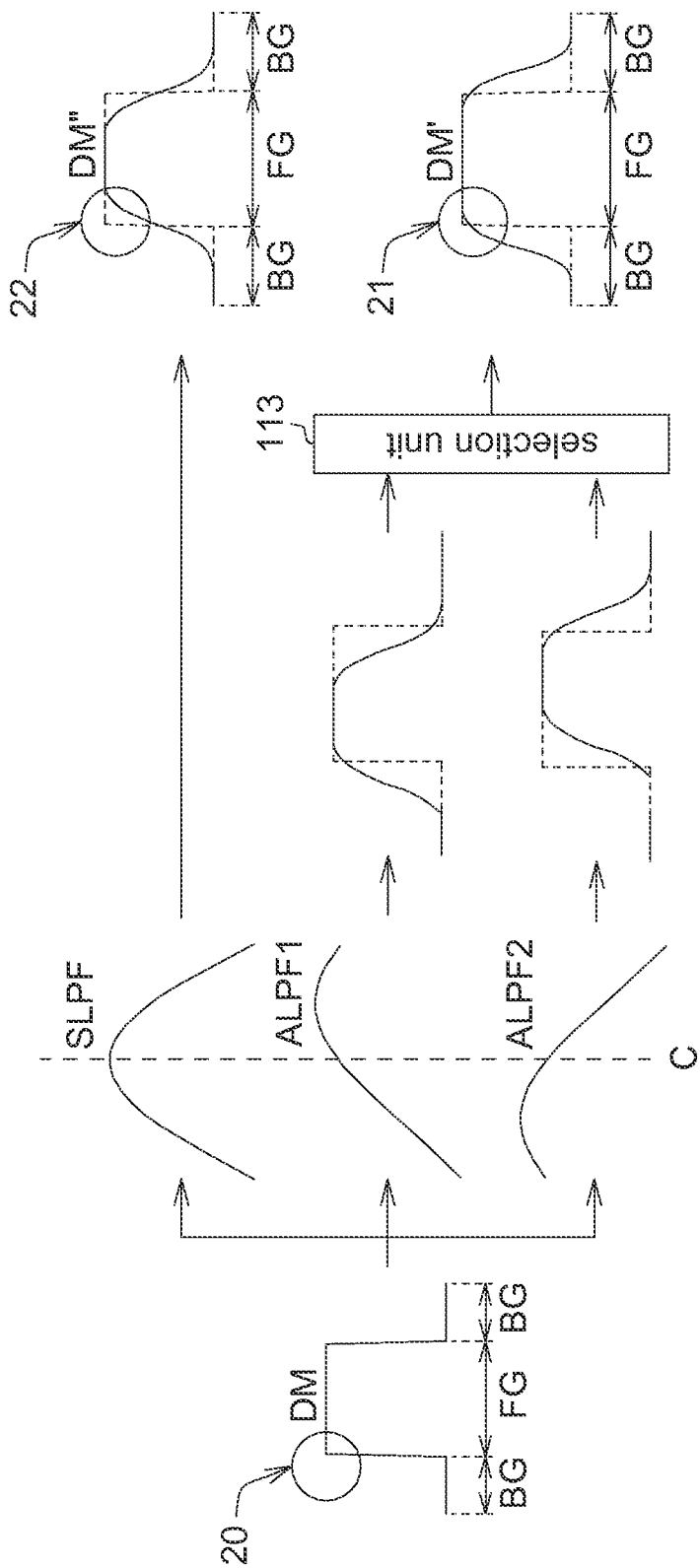
FIG. 2 shows asymmetric low-pass filtering and symmetric low-pass filtering on a depth map.

Referring to FIG. 2, results obtained by performing asymmetric low-pass filtering and symmetric low-pass filtering on a depth map are shown. As indicated in the embodiment of the disclosure illustrated in FIG. 2, the input depth map DM is inputted to asymmetric low-pass filters 111 and 112 to obtain two asymmetric low-pass filtering results. Next, the two asymmetric low-pass filtering results are inputted to the selection unit 113.

In the embodiment of the disclosure, the selection unit 113 selects and outputs the larger one from two inputs as the depth map DM'. Suppose the depth map DM includes 9 depth bits D1~D9. After the 9 depth bits D1~D9 are processed by the asymmetric low-pass filters 111 and 112. depth bits D1'~D9' and D1"~D9" are obtained respectively. The selection unit 113 compares the depth bits D1' and D1", and then selects and outputs the larger one among the depth bits D1' and D1". The selection unit 113 performs the same operation on the remaining depth bits D2'~D9' and D2"~D9", and outputs the depth map DM' accordingly.

To highlight the features of the embodiment of the disclosure, a symmetric low-pass filtering result DM" is obtained by inputting the input depth map DM to a symmetric low-pass filter (SLPF) as indicated in FIG. 2.

Furthermore, the asymmetric low-pass filters 111 and 112 are horizontally mirrored to each other. Let a central point C be taken for example as indicated in FIG. 2. The symmetric low-pass filters are symmetric around the central point C. None of the asymmetric low-pass filters 111 and 112 is symmetric around the central point C. However, the right half part of the asymmetric low-pass filter 111 and the left half part of the asymmetric low-pass filter 112 are symmetric around the central point C. The left half part of the asymmetric low-pass filter 111 and the right half part of the asymmetric low-pass filters 112 are symmetric around the central point C.

How the embodiment of the disclosure mitigates the blur/distortion/deformation/discontinuity on the boundaries of a foreground object is illustrated with FIG. 2. As indicated in the depth difference 20 of FIG. 2, the depth difference between the foreground (FG) object and the background (BG) object is large. The viewer experiences a large disparity between the foreground object and the background object, and the blur/distortion/deformation/discontinuity on the boundaries of the foreground object is apparent to the viewer.

As indicated in depth difference 22 of FIG. 2, the depth of the foreground object corresponding to the depth map DM" produced by the symmetric low-pass filters is changed, making the foreground object deformed and the viewer unable to focus the foreground object.

As indicated in the depth difference 21 of FIG. 2, the depth of the foreground object corresponding to the depth map DM' remains unchanged after the depth map is processed by two asymmetric low-pass filters and the selection unit. That is, the foreground object is not deformed. However, a change in the depth of the background object may make the background object deformed. However, the human eyes are not sensitive to the discomfort caused by the deformation of the background object. That is, the viewer experiences lesser discomfort when watching a deformed background object than watching a deformed foreground object. Thus, the embodiment of the disclosure improves the viewer's comfort when watching stereoscopic images.

In the embodiment of the disclosure, the asymmetric filtering does not change the depth difference between the foreground object and the background object, To put it in greater details, the filtering slows down the trend of change in depth from the background object to the foreground object. The results of the symmetric filtering show that both the depth of the foreground object and the depth of the background object are changed. The results of the asymmetric filtering show that the depth of the background object is changed but the depth of the foreground object remains unchanged.

Figure 3:
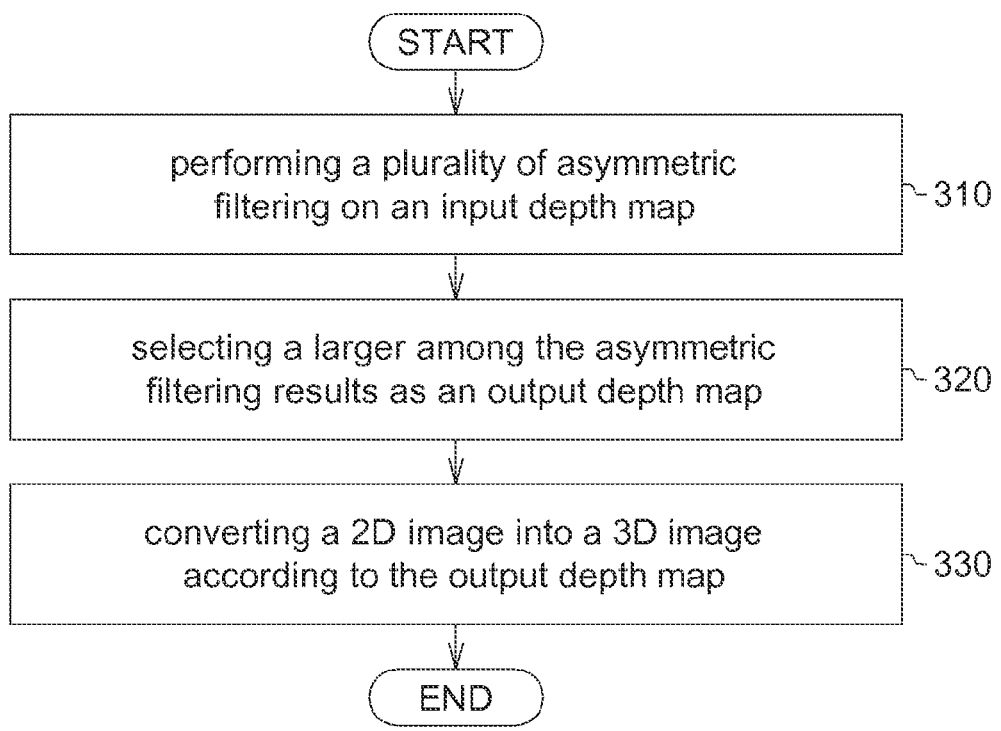
FIG. 3 shows a flowchart of a 3D image processing method according to the embodiment of the e disclosure.

Referring to FIG. 3, a flowchart of a 3D image processing method according to the embodiment of the disclosure is shown. In step 310, a plurality of asymmetric low-pass filtering processes is performed on an input depth map, for example by the asymmetric low-pass filters 111 and 112. Details of the asymmetric low-pass filtering processes are similar to the above disclosure, and are not repeated here.

In step 320, a larger one is selected among the asymmetric low-pass filtering results as an output depth map, for example by the selection unit 113. Details are similar to the above disclosure, and are not repeated here.

In step 330, a 2D image is converted into a 3D image according to the output depth map, for example by the wrapping unit 120. Details are similar to the above disclosure, and are not repeated here, In the above disclosure, two asymmetric low-pass filters are used as an exemplification, but the disclosure is not limited thereto. For example, the exemplification of applying more asymmetric low-pass filters is still within the spirit of the disclosure.

According to the embodiment of the disclosure, the asymmetric low-pass filtering process performed on the depth map slows down the trend of change in depth from the background object to the foreground object to mitigate the blur/distortion/deformation/discontinuity on the boundaries of a foreground object boundaries and improve the viewer's comfort when watching 3D images.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A three-dimension (3D) image processing method, comprising:
    performing a plurality of asymmetric filtering on an input depth map to obtain a plurality of asymmetric filtering results;
    selecting one among the asymmetric filtering results as an output depth map; and
    converting a two-dimension (2D) image into a 3D image according to the output depth map.

2. The 3D image processing method according to claim 1, wherein, the input depth map is inputted to a plurality of asymmetric low-pass filters to obtain the asymmetric filtering results.

3. The 3D image processing method according to claim 2, wherein, the asymmetric low-pass filters are horizontally mirrored to each other.

4. The 3D image processing method according to claim 3, wherein,
    with respect to a central point, the asymmetric low-pass filters are not symmetric around the central point;

a right half part of one of the asymmetric low-pass filters and a left half part of another one of the asymmetric low-pass filters are symmetric around the central point; and a left half part of the one of the asymmetric low-pass filters and a right half part of the another one of the asymmetric low-pass filters are symmetric around the central point.

5. The 3D image processing method according to claim 1 wherein, the larger one among the asymmetric filtering results is selected as the output depth map.

6. A 3D image processing apparatus, comprising:

a depth map processing unit for performing a plurality of asymmetric filtering on an input depth map to obtain a plurality of asymmetric filtering results, and selecting one among the asymmetric filtering results as an output depth map; and a wrapping unit coupled to the depth map processing unit for converting a 2D image into a 3D image according to the output depth map.

7. The 3D image processing apparatus according to claim 6, wherein, the depth map processing unit comprises a plurality of asymmetric low-pass filters, and the input depth map is inputted to the asymmetric low-pass filters to obtain the asymmetric filtering results.

8. The 3D image processing apparatus according to claim 7, wherein, the asymmetric low-pass filters are horizontally mirrored to each other.

9. The 3D image processing apparatus according to claim 8, wherein, with respect to a central point, the asymmetric low-pass filters are not symmetric around the central point;

a right half part of one of the asymmetric low-pass filters and a left half part of another one of the asymmetric low-pass filters are symmetric around the central point; and a left half part of the one of the asymmetric low-pass filters and a right half part of the another one of the asymmetric low-pass filters are symmetric around the central point.

10. The 3D image processing apparatus according to claim 6, wherein, the depth map processing unit further comprises a selection unit which selects the larger among the asymmetric filtering results as the output depth map.

\* \* \* \* \*